United States Patent
Stoltz (10) Patent No.: US 6,279,961 B1
(45) Date of Patent: Aug. 28, 2001

(54) ROTATABLE HOSE COUPLING (75) Inventor: Wernher J. Stoltz, Gauteng (ZA)

(73) Assignee: Polaris Pools Systems, Inc., Vista, CA (US)

( * ) Notice: Subject to any disclaimer, the term of this patent is extended or adjusted under 35 U.S.C. 154(b) by 0 days.

(21) Appl. No.: 09/709,619

(22) Filed: Nov. 9, 2000

Related U.S. Application Data
(60) Provisional application No. 60/165,684, filed on Nov. 16, 1999.

(51) Int. Cl.[7] .............................. E04H 4/16; F16L 27/08
(52) U.S. Cl. ........................ 285/7; 285/272; 285/299; 285/306; 15/1.7
(58) Field of Search ................. 285/7, 83, 272, 285/299, 300, 306, 358, 900, 307

(56) References Cited

U.S. PATENT DOCUMENTS

| | | |
|---|---|---|
| 2,819,097 * | 1/1958 | Lang ........................ 285/93 |
| 2,950,929 * | 8/1960 | Nicolson ................... 285/86 |
| 3,291,152 * | 12/1966 | Comer ...................... 285/83 |
| 4,558,479 | 12/1985 | Greskovics et al. . |
| 4,643,217 * | 2/1987 | Frentzel ................... 137/112 |
| 4,709,454 * | 12/1987 | Barnes ...................... 285/307 |
| 4,982,754 | 1/1991 | Kallenbach . |
| 5,029,600 | 7/1991 | McCullagh . |
| 5,082,028 | 1/1992 | Jean-Jacques . |
| 5,195,563 | 3/1993 | Brooks . |
| 5,329,648 | 7/1994 | Davey . |
| 5,450,645 * | 9/1995 | Atkins ...................... 15/1.7 |
| 5,775,741 | 7/1998 | Rice et al. . |
| 6,094,764 * | 8/2000 | Veloskey et al. .......... 15/1.7 |
| 6,187,181 * | 2/2001 | Stoltz et al. ............... 210/122 |
| 6,220,636 * | 4/2001 | Veloskey ................... 285/261 |

FOREIGN PATENT DOCUMENTS

| | | | |
|---|---|---|---|
| 323863 * | 7/1989 | (EP) | 285/307 |
| 2106694 * | 5/1972 | (FR) | 285/307 |
| WO 9851888 | 11/1998 | (WO) . | |

* cited by examiner

Primary Examiner—Eric K. Nicholson
(74) Attorney, Agent, or Firm—Kelly Bauersfeld Lowry & Kelley, LLP (57) ABSTRACT

A rotatable hose coupling is provided for use with a pool cleaner, particularly of the type powered by a suction or vacuum source via a flexible vacuum hose or the like connected to the suction side of conventional pool water filtration equipment, wherein the rotatable hose coupling is mounted in-line along the vacuum hose and responds to cyclic pressure differentials to index the hose through a rotational increment each time the filtration equipment is turned on and off. The rotatable hose coupling comprises a tubular plunger having one end received axially and slidably within a cam housing defining an axially opposed and spaced-apart pair of cam surfaces. At least one radially extending cam pin carried by the plunger engages the cam surfaces to rotatably index the cam housing relative to the plunger in response to axial back-and-forth displacement of the plunger within the cam housing. A spring-loaded bellows assembly normally urges the plunger in one axial direction relative to the cam housing when the filtration equipment is turned off, but responds to pressure when the filtration equipment is turned on to displace the plunger in an opposite axial direction relative to the cam housing. The plunger and cam housing are adapted for respective in-line connection along the hose length, typically near a coupling site for connecting the hose to the filtration equipment.

25 Claims, 5 Drawing Sheets

ROTATABLE HOSE COUPLING

This application claims the benefit of U.S. Provisional Application No. 60/165,684, filed Nov. 16, 1999.

BACKGROUND OF THE INVENTION

This invention relates generally to pool cleaning systems of the type including a so-called automatic pool cleaning device adapted for travel over submerged surfaces of a swimming pool or the like to pick up and collect accumulated debris such as leaves, twigs, sand and silt. More particularly, this invention relates to a rotatable hose coupling for installation along a flexible hose used for connecting the pool cleaner to a hydraulic power source such as a suction or vacuum source by connection to the suction side of a conventional pool water filtration system. The rotatable hose coupling of the present invention is designed to incrementally rotate or index the flexible hose through a part-circle step each time the filtration system is cycled on and off.

Pool cleaner systems and related devices are generally well known in the art for use in maintaining residential and commercial swimming pools in a clean and attractive condition. In this regard, swimming pools conventionally include a water filtration system equipped with a pump for drawing or suctioning water from the pool for circulation through a filter canister having filter media therein to remove and collect water-entrained debris such as leaves and twigs as well as fine particulate including sand and silt. In a typical arrangement, at least a portion of the pool water is vacuum-drawn over a weir mounted within a so-called skimmer well positioned substantially at the water surface to draw and collect floating debris to the filter equipment. From the filter canister, the water is recirculated to the pool via one or more return lines. Such filtration equipment is normally operated for several hours on a daily basis and serves, in combination with traditional chemical treatments such as chlorination or the like, to maintain the pool water in a clean and clear sanitary state. However, the water filtration system is ineffective to filter out debris which settles onto submerged floor and side wall surfaces of the swimming pool. In the past, settled debris has typically been removed by coupling a vacuum hose to the suction side of the pool water filtration system, such as by connecting the vacuum hose to the skimmer well located near the water surface at one side of the pool, and then manually moving a vacuum head coupled to the hose over the submerged pool surfaces to vacuum settled debris directly to the filter canister where it is collected and separated from the pool water. However, manual vacuuming of a swimming pool is a labor intensive task and is thus not typically performed by the pool owner or pool cleaning service personnel on a daily basis.

So-called automatic pool cleaner devices have been developed over the years for cleaning submerged pool surfaces, thereby substantially eliminating the need for labor intensive manual vacuuming. Such automatic pool cleaners typically comprise a relatively compact cleaner housing or head coupled to the pool water filtration system by a hose and including water-powered means for causing the cleaner to travel about within a swimming pool to dislodge and collect settled debris. In one form, the pool cleaner is connected to the return or pressure side of the filtration system for receiving positive pressure water which powers a turbine for rotatably driving cleaner wheels, and also functions by venturi action to draw settled debris into a filter bag. See, for example, U.S. Pat. Nos. 3,882,574; 4,558,479; 4,589,986; and 4,734,954. In another form, the pool cleaner is coupled by a vacuum hose to the suction side of the filtration system, whereby water is drawn through the pool cleaner to operate a drive mechanism for transporting the cleaner within the pool while vacuuming settled debris to the filter canister of the pool filtration system. See, for example, U.S. Pat. Nos. 3,803,658; 4,023,227; 4,133,068; 4,208,752; 4,643,217; 4,679,867; 4,729,406; 4,761,848; 5,105,496; 5,265,297; 5,634,229; and 6,094,764.

For optimum cleaning efficiency, it is desirable for the pool cleaner to traverse submerged pool floor and side wall surfaces with sufficient and relatively constant traction to maintain vacuuming structures in close proximity with submerged pool surfaces. In addition, it is desirable for the pool cleaner to travel in a substantially random pattern to insure coverage of most or all submerged pool surfaces within a relatively short period of time. However, the traction and random travel characteristics of a given pool cleaner can be adversely affected by the flexible hose which can take a "set" in a particular deformed or curved configuration in response to aging and/or exposure to thermal cycling during normal use. When the flexible hose assumes a particular set shape, the hose can provide resistance to pool cleaner movement both in terms of traction and random travel. In some pools, assumption of a set hose shape can result in the pool cleaner traveling along a repeatable and thus non-random path whereby the pool cleaner may not cover and thus does not clean large portions of the pool. In addition, when this occurs, the same discrete surfaces of the hose can repeatedly scrub against abrasive plaster pool water surfaces to cause premature hose leakage and failure. Spiral wound or corrugated flexible hoses of the type normally used with suction powered pool cleaners are especially susceptible to assuming an undesirable set shape during use.

Swivel couplings have been designed for use with flexible hoses coupled to a pool cleaner, wherein the swivel couplings are typically installed at spaced-apart locations along the hose length to rotatably interconnect a plurality of hose segments. See, for example, U.S. Pat. Nos. 4,558,479; 5,195,563; and 5,775,741. During normal operation of the pool cleaner, the swivel couplings are intended to accommodate relative rotation between adjacent hose segments in the course of normal hose twisting and turning as the pool cleaner travels about within the pool. While such relative rotation between hose segments can be effective in minimizing or eliminating the hose "set" problem, such swivel couplings function passively to permit some hose rotation and do not function actively to insure at least some hose rotation on a regular basis. Moreover, prior swivel couplings have exhibited a tendency to bind and thus become non-functional upon intrusion of grit or silt present in the pool water. Accordingly, such prior swivel couplings have not resolved the hose "set" problem.

The present invention relates to a rotatable hose coupling designed for in-line connection along the flexible hose coupled between the pool filtration equipment and a pool cleaner. The rotatable hose coupling of the invention actively responds to pressure fluctuations associated with cyclic on-off operation of the filtration equipment to rotatably index the hose in a manner which prevents the hose from assuming a particular "set" shape.

SUMMARY OF THE INVENTION

In accordance with the invention, a rotatable hose coupling is provided for use with a pool cleaner, particularly of the type powered by a suction or vacuum source via a flexible vacuum hose or the like connected to the suction side of conventional pool water filtration equipment. The rotatable hose coupling is mounted in-line along the vacuum hose and responds to cyclic pressure differentials to index the hose through a rotational increment each time the filtration equipment is turned on and off.

In a preferred form, the rotatable hose coupling comprises a tubular plunger having one end received axially and slidably within a cam housing defining an axially opposed and spaced-apart pair of cam surfaces. The plunger and cam housing are adapted for respective in-line connection along the hose length, typically near a coupling site for connecting the hose to the filtration equipment. The plunger carries at least one and preferably a diametrically opposed pair of radially extending cam pins for engaging the cam surfaces on the cam housing to rotatably index the cam housing relative to the plunger in response to axial back-and-forth displacement of the plunger within the cam housing. A spring-loaded bellows assembly normally urges the plunger in one axial direction relative to the cam housing when the filtration equipment is turned off, but responds to pressure when the filtration equipment is turned on to displace the plunger in an opposite axial direction relative to the cam housing.

With this construction, each time the filtration equipment is turned on or off, the plunger translates axially within the cam housing to displace the cam housing through a part-circle rotational increment. The thus rotates segment of the flexible hose connected thereto through the same part-circle rotational increment to minimize or eliminate risk of the typically plastic hose taking a "set" over an extended period of use.

Other features and advantages of the present invention will become more apparent from the following detailed description taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
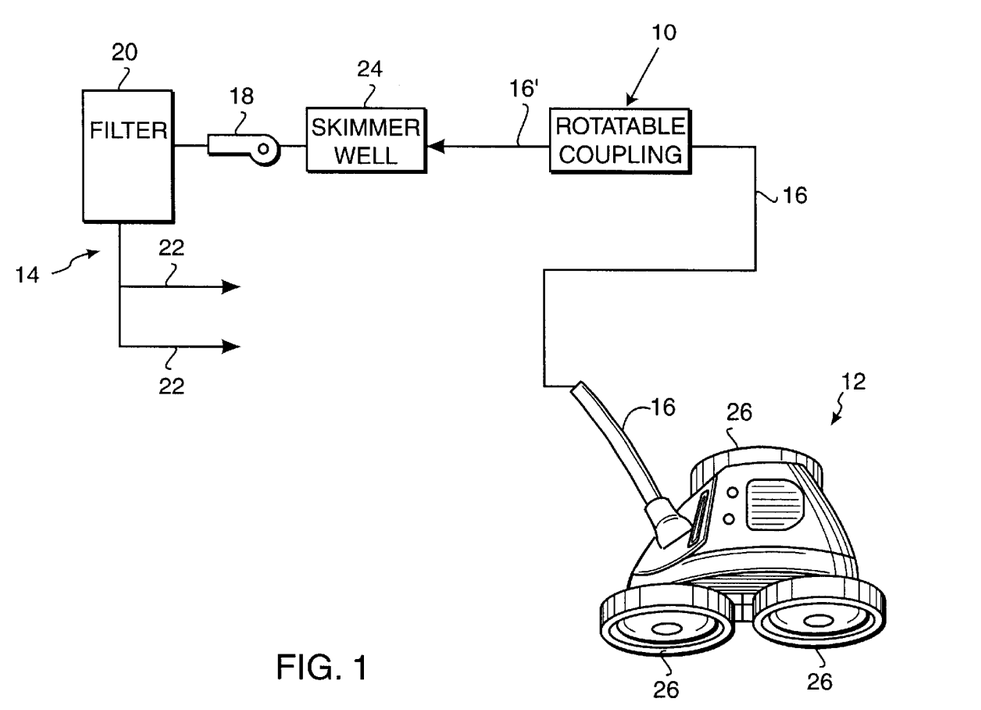
FIG. 1 is a schematic representation of a swimming pool filtration system in combination with a suction-powered pool cleaner for cleaning submerged pool floor and side wall surfaces, and further including a rotatable hose coupling; of the present invention.
Figure 2:
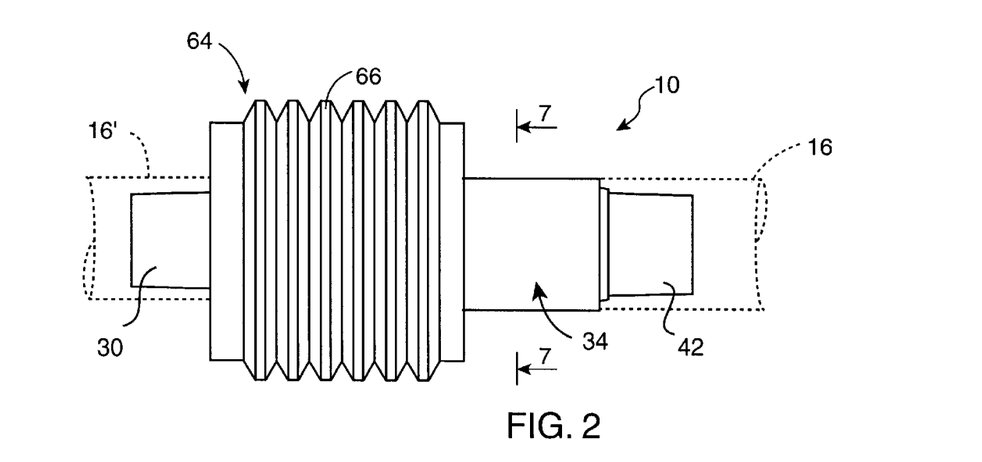
FIG. 2 is a side elevation view of the rotatable hose coupling embodying the novel tures of the invention.
Figure 3:
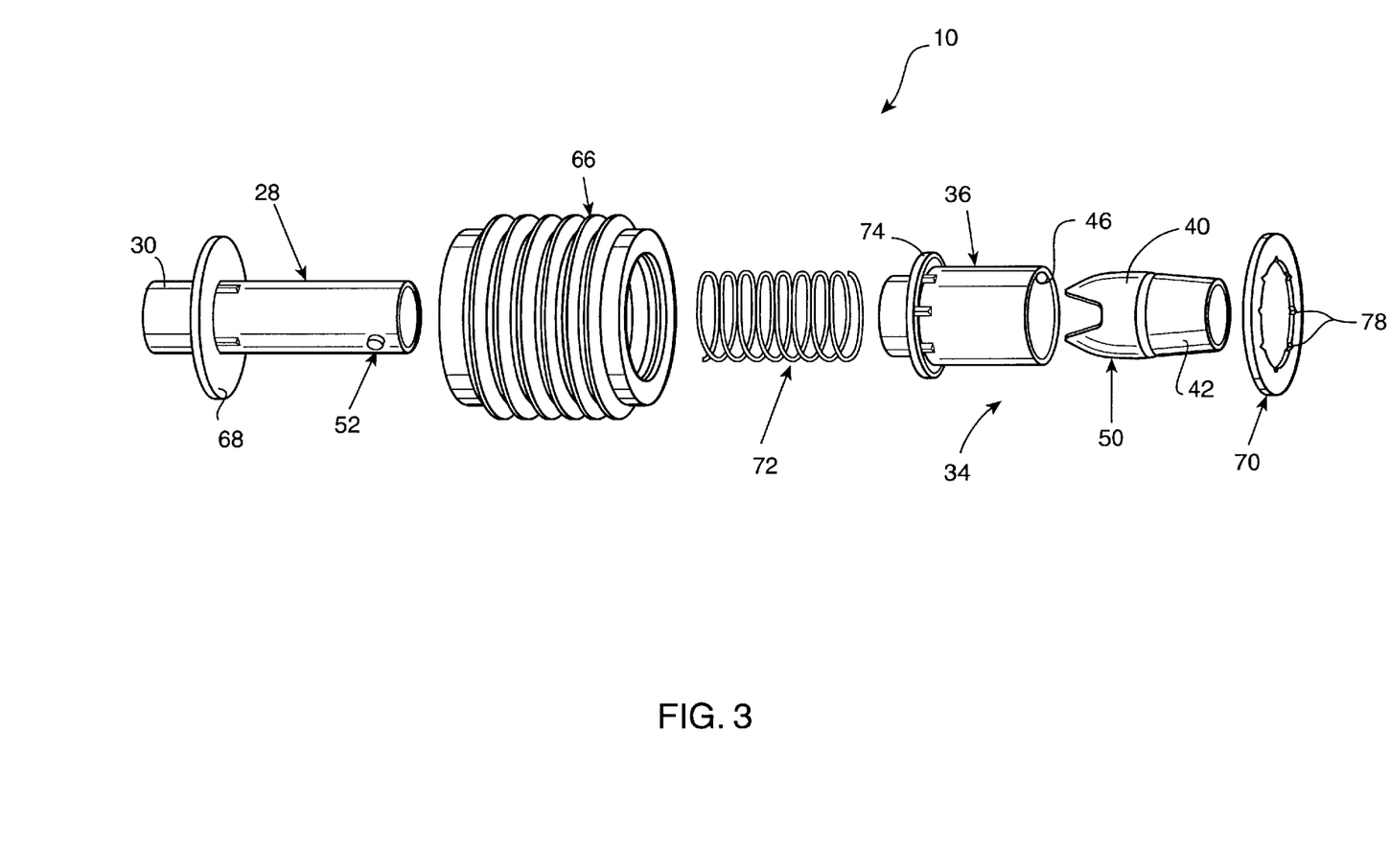
FIG. 3 is an exploded perspective view illustrating components of the rotatable hose coupling shown in FIG. 2.

As shown in the exemplary drawings, a rotatable hose coupling referred to generally in FIGS. 1–7 by the reference numeral 10 is provided for use in a water filtration and cleaning system for a swimming pool or the like, wherein the hose coupling 10 is used in combination with a pool cleaner 12 of the suction-powered type for vacuuming debris such as leaves and twigs as well as small particulate such as sand and silt settled onto submerged floor and wall surfaces of the swimming pool. The illustrative pool cleaner 12 shown in FIG. 1 is powered by a suction or vacuum source, such as a conventional pool water filtration system 14 as depicted schematically in FIG. 1, by connection to the filtration system via a flexible vacuum hose 16. The rotatable hose coupling 10 is mounted in-line along the length of the vacuum hose 16, and responds to pressure fluctuations caused by each on-off operative cycle of the filtration system 14 to rotate the hose 16 through a part-circle stroke or step. In this manner, the hose coupling 10 minimizes or eliminates any tendency of the hose 16 to take a curved or deformed "set" which could otherwise adversely impact the cleaning efficiency or desired random travel pattern of the pool cleaner 12.

The pool water filtration system 14 conventionally includes a pump 18 for drawing water from the swimming pool for passage through a filter canister 20 having a selected filtration media (not shown) contained therein for capturing and collecting silt and grit and other particulate debris matter entrained in the water flow stream. The thus-filtered water is then recirculated to the swimming pool through one or more return conduits 22. In a typical water filtration system, at least a portion of the water drawn from the pool by the pump 18 is drawn through a skimmer well 24 which is normally mounted at one edge of the pool generally at the water's surface and includes a weir (not shown) over which water is drawn to skim and collect debris floating on the surface of the pool water.

When a suction-powered pool cleaner 12 is coupled with the filtration system 14 for enhanced cleaning of pool surfaces, the vacuum hose 16 is often connected (as viewed schematically in FIG. 1) to extend between the skimmer well 24 and the pool cleaner. Alternately, it will be recognized and understood that some swimming pools may be equipped with a dedicated suction cleaner flow line (not shown) coupled directly from the pool wall to the filtration system 14, in which case the vacuum hose 16 would be coupled to said suction flow line. In either case, the filtration system 14 draws water from the swimming pool through the cleaner 12 and further through the vacuum hose 16 to the pump 18 for delivery in turn to the filter canister 20. This vacuum or suction water flow drawn through the pool cleaner 12 provides a power source for rotatably driving the pool cleaner in a manner achieving substantially random travel of the cleaner throughout the pool to dislodge and vacuum debris settled upon submerged pool floor and side wall surfaces. While the specific type of suction-powered pool cleaner may vary, one preferred pool cleaner is constructed as shown and described in U.S. Pat. No. 6,094,764, which is incorporated by reference herein. Such pool cleaner, as illustrated in FIG. 1, incorporates internal drive means (not shown) for rotatably driving one or more cleaner wheels 26 for transporting the pool cleaner throughout the pool, together with means for vacuuming settled debris to the vacuum hose 16. Other exemplary suction powered pool cleaners are shown and described, by way of example, in U.S. Pat. Nos. 3,803,658; 4,023,227; 4,133,068; 4,208,752; 4,643,217; 4,679,867; 4,729,406; 4,761,848; 5,105,496; 5,265,297; and 5,634,229.

In general terms, the rotatable hose coupling 10 of the present invention is installed in-line along the length of the vacuum hose 16. FIG. 1 shows the hose coupling 10 installed between a relatively short first segment of the hose 16' coupled to the skimmer well 24, and a comparatively longer second segment of the hose 16 coupled to the pool cleaner 12. Alternately, it will be understood that the hose coupling may be coupled at one end of the hose 16 and suitably adapted for direct connection to a suction flow cleaner line (not shown) coupled directly from the pool wall to the filtration system 14. In either installation configuration, the hose coupling responds to pressure changes along the length of the hose as the pump 18 of the filtration system 14 is turned on and off, to rotate the portion of the hose 16 extending between the coupling 10 and the pool cleaner 12 through a part-circle increment. Such rotation prevents the hose 16 from taking a set as a result of aging and exposure to temperature variations.

As shown best in FIGS. 2–6, the rotatable hose coupling 10 comprises a first housing member shown as a generally tubular plunger 28 formed from lightweight molded plastic or the like, to include a cylindrical fitting 30 at one end adapted for suitable attachment as by a press-fit connection of the like to the first segment 16' of the hose. From the hose fitting 30, the plunger 28 extends axially to define a central passage 32 for water flow therethrough. An opposite end of the plunger 28 is axially and slidably received within a second housing member shown as a generally cylindrical cam housing 34 which is also conveniently constructed from lightweight molded plastic components or the like. As shown, this cam housing 34 comprises a primary sleeve 36 defining a slide bore 38 (FIGS. 4 and 5) for slidably receiving the plunger 28, and a secondary sleeve 40 fitted into an outboard end of the primary sleeve 36 to project axially outwardly therefrom. An outboard end of this secondary sleeve 40 defines a cylindrical hose fitting 42 adapted for suitable attachment as by a press-fit connection of the like to the second hose segment coupled to the pool cleaner 12. The slide bore 38 and the cylindrical hose fitting 42 cooperatively define a fluid flow passage disposed in-line with the central passage 32 formed through the plunger 28.

The primary and secondary sleeves 36, 40 forming the cam housing 34 are interconnected to each other in a manner precluding relative rotation therebetween, such as by use of an appropriate adhesive for securely and rigidly connecting a portion of the secondary sleeve 40 coaxially within the outboard end of the primary sleeve 36. Importantly, when interconnected, the primary sleeve 36 defines a radially outwardly stepped bore 46 at the outboard side of the slide bore 38, and an axially presented first cam surface 48 (FIGS. 4–6) formed within the stepped bore 46 is positioned in axially opposed and spaced-apart relation to a counterpart second axially presented cam surface 50 on the inboard end of the secondary sleeve 40. A pair of radially outwardly projecting cam elements such as cam pins 52 are formed near the end of the plunger 28, preferably at diametrically opposite locations as shown, and are positioned axially between the first and second cam surfaces 48, 50.

Figures 6, 7:
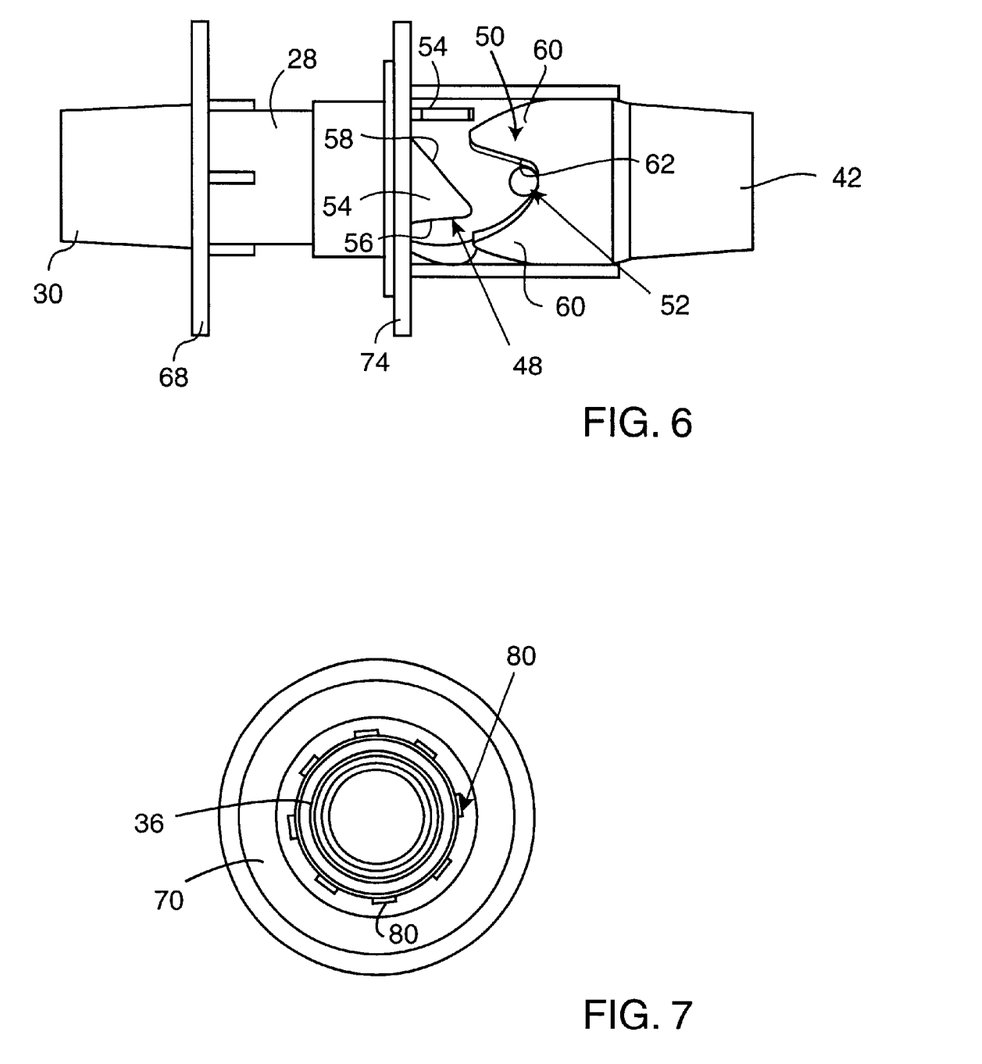
FIG. 6 is a side elevation view of a portion of the hose coupling shown in the axially expanded position, with portions of a spring bellows assembly removed to show the geometry of internal coupling components.
FIG. 7 is an end elevation view taken generally on the line 7—7 of FIG. 2.

More particularly, as shown best in FIG. 6, the first cam surface 48 on the primary sleeve 36 comprises a circumferential repeating array of sawtooth like teeth 56 each including a substantially axially extending edge 56 at one side and a substantially ramped edge 58 extending axially and partially circumferentially at an opposite side. In the preferred arrangement, four such teeth 54 are arranged about the internal circumference of the stepped bore 46, generally in axially misalignment with a corresponding number of sawtooth like teeth 60 defining the second cam surface 50 on the inboard axial end of the secondary sleeve 40. FIG. 6 shows the secondary cam teeth 60 to have relatively curved opposite side edges extending axially and partially circumferentially, with a curved trough or seat 62 disposed between each adjacent pair of the teeth 60.

In operation, as will be described in more detail, the plunger 28 translates axially back and forth within the cam housing 34 as the pump 18 is turned on and off, resulting in axial back-and-forth displacement of the cam pins 52 into alternate engagement with the first and second cam surfaces 48, 50. The configuration of these cam surfaces 48, 50 causes the cam housing 34 to rotate through a part-circle increment relative to the plunger 28 each time the pump 18 is cycled on and off. In the preferred embodiment wherein each cam surface includes four teeth, each on-off cycle thus results in an approximate 90° rotation of the cam housing relative to the plunger. Since the plunger 28 is normally secured to the skimmer well 24 or the like by a nonrotational coupling, the relative rotational output results in part-circle displacement of the second hose segment 16 coupled between the cam housing 34 and the pool cleaner 12. Alternately, in the event that the hose coupling 10 is installed along the hose length in a reverse orientation, the cam housing 34 would typically be connected to the skimmer well 24 by a nonrotational coupling, whereupon the plunger 28 would undergo part-circle rotation to index the hose 16.

Figure 4:
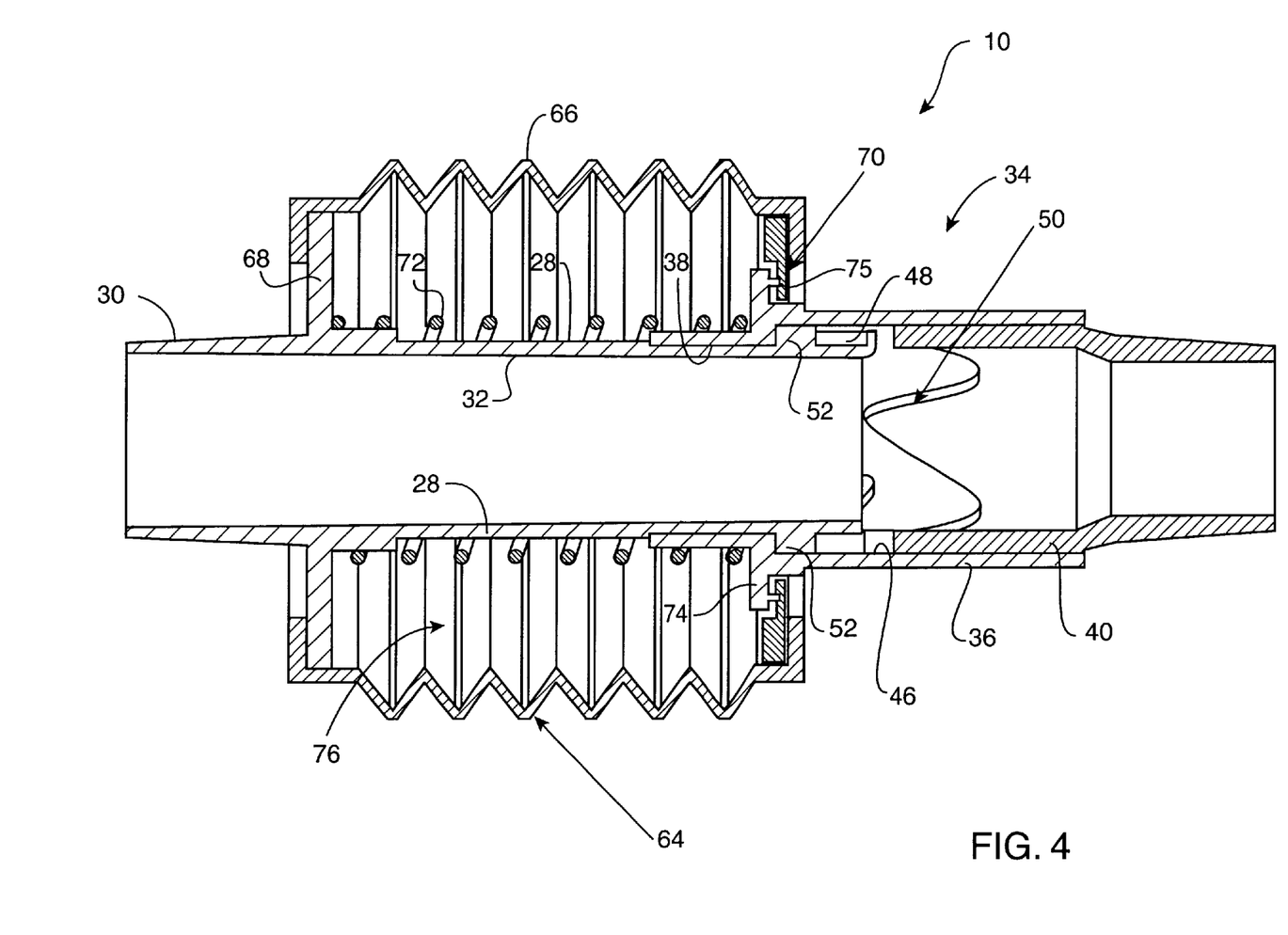
FIG. 4 is an enlarged fragmented longitudinal sectional view of the hose coupling shown in an axially expanded or extended position.

Axial displacement of the plunger 28 relative to the cam housing 34, in response to on-off operation of the filtration system 14, is achieved by a spring-loaded bellows assembly 64. More particularly, an axially collapsible flexible bellows 66 is carried about the plunger 28, with one axial end attached to a radially enlarged flange 68 on the plunger 28, and an opposite axial end secured to a bearing ring 70. A compression spring 72 is carried within the bellows 66 and reacts between the plunger flange 68 and a second radially enlarged flange 74 on the primary sleeve 36 of the cam housing 34. The normal axial expansion force applied by the spring 72 urges the plunger flange 68 in an axial direction away from the cam housing 34, thereby drawing the bearing ring 70 into axial bearing engagement with a seal ring 75 formed on an outboard face of the flange 74 on the cam housing. This configuration is shown in FIG. 4, and represents the relative positions of the components when the pump 18 is turned off. As shown, the cam pins 52 on the plunger 28 are drawn into engagement with the first cam surface 48. In the embodiment wherein the plunger 28 comprises the nonrotational element, axial displacement of the cam pins toward the first cam surface 48 causes the cam pins 52 to contact the ramped edges 58 of a corresponding pair of the teeth 54. The cam pins 52 slide axially along these ramped tooth edges 58, to impart a part-circle rotational movement to the cam housing 36, as the cam pins 52 eventually seat within associated troughs between the cam teeth 54.

Figure 5:
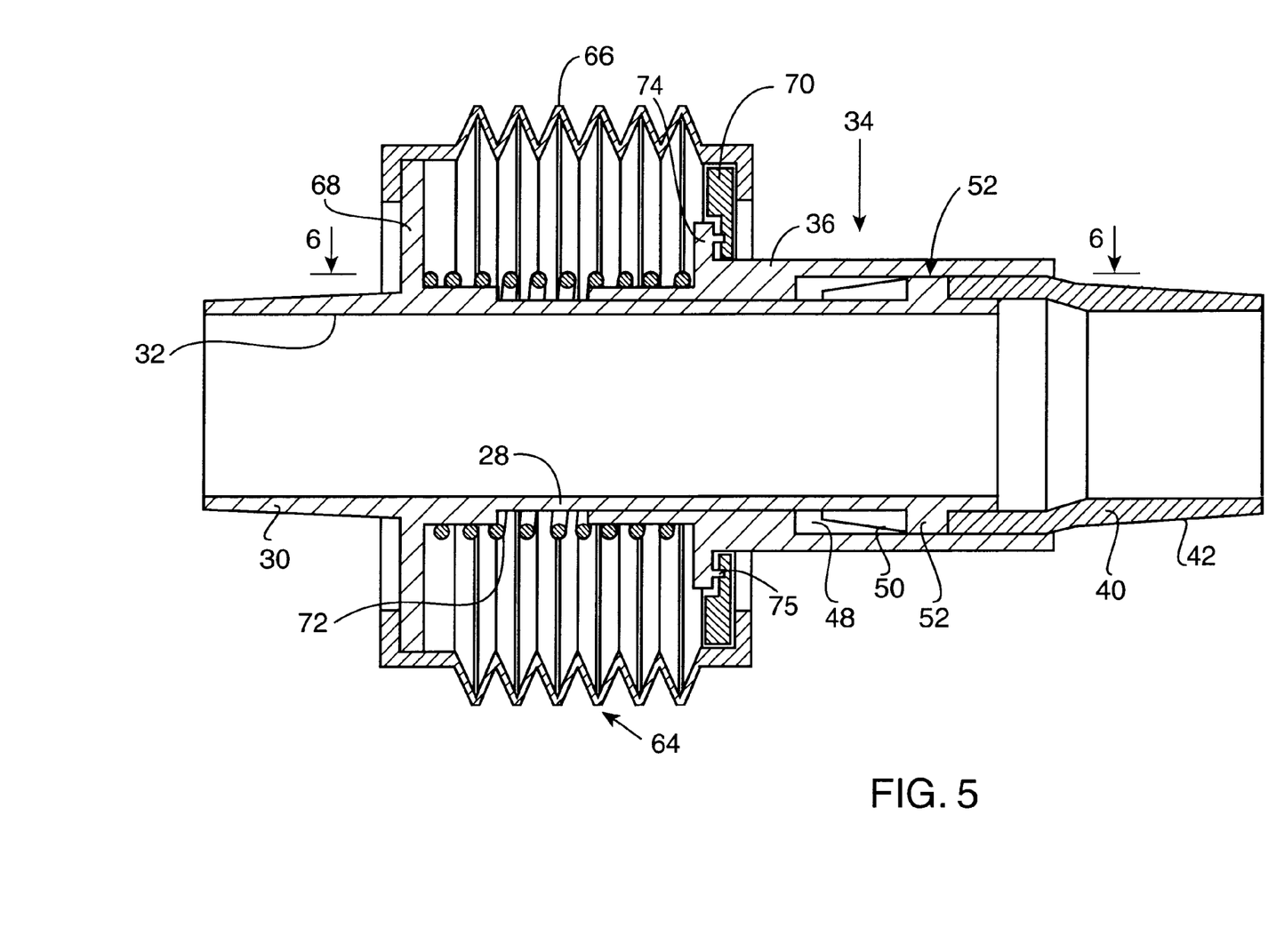
FIG. 5 is an enlarged fragmented longitudinal sectional view of the hose coupling similar to FIG. 4, but showing the hose coupling in an axially collapsed or retracted position.

When the pump 18 of the pool water filtration system 14 is turned on, a vacuum or negative pressure is applied to the hose 16 as well as the flow passage 32 through the plunger 28. Sufficient clearance exists between the plunger 28 and the slide bore 38 to communicate this vacuum to the interior 76 of the flexible bellows 66. Alternately, to insure such communication of the negative pressure to the bellows interior, one or more bleed ports (not shown) may be formed in the plunger 28 in the portion thereof encircled by the spring 72. The presence of negative pressure within the bellows chamber 76 causes the bellows 66 to move from the axially expanded or extended configuration of FIG. 4 to an axially collapsed or retracted configuration as shown in FIG. 5. Such bellows collapse is accompanied by axial displacement of the plunger 28 relative to the cam housing 34, to move the cam pins 52 into engagement with the second cam surface 50 (FIG. 5). During such movement, the cam pins 52 contact the curved side edges of a corresponding pair of the cam teeth 60, to impart a part-circle rotational movement to the cam housing 36, as the cam pins 52 eventually seat within associated troughs 62 between the cam teeth 60.

Subsequent turning off of the system pump 18 causes the pressure within the bellows chamber 76 to return to ambient pressure and thereby allow the spring 72 to return the cam pins 52 axially back into engagement with the first cam surface 48 and its associated cam teeth 54, as viewed in FIG. 4. Such back-and-forth displacement of the plunger 28 to move the cam pins 52 back-and-forth between the two cam surfaces 48, 50 thus results in incremental part-circle rotation of the hose 16 for each on-off cycle of the pump 18.

Part-circle rotation of the vacuum hose 16 beneficially minimizes or eliminates risk of the typically plastic hose taking a "set" over an extended period of use. In this regard, assumption by the hose of a "set" curved shape can adversely impact the cleaning efficiency and desired random travel path of the associated pool cleaner 12. Moreover, excessive hose wear attributable to repeated friction contact between the same discrete surfaces of the hose with abrasive plaster pool walls can also result in premature hose leaking and failure. Regular part-circle rotation of the hose 16 by use of the rotatable hose coupling of the present invention effectively re-orients the hose each time the pool equipment is cycled on and off to prevent a "set" hose shape from occurring.

In accordance with a further aspect of the invention, the bearing ring 70 may include an inner diameter surface defining a circumferential array of tapered ratchet seats 78 (FIG. 3) for engaging corresponding tapered ratchet teeth 80 (FIG. 7) formed on the cam housing sleeve 36. These ratchet seats 78 and associated teeth 80 are tapered to insure unidirectional step-wise rotation of the cam housing 34 relative to the plunger 28. Accordingly, over a succession of on-off pump cycles, the vacuum hose 16 is rotated through full circle revolutions. Moreover, rotational backlash, which could otherwise enable the plunger 28 to shift back and forth without resultant rotation of the cam housing, is effectively prevented. Component rotation is the desired direction may also be facilitated by winding the compression spring 72 in a direction to apply a small rotational torque to the cam housing flange 74, wherein this torque is applied in the desired rotational direction.

A variety of modifications and improvements in and to the rotatable hose coupling of the present invention will be apparent to those persons skilled in the art. For example, while the invention has been shown and described with respect to a vacuum hose 16 for connection to a suction-powered pool cleaner, it will be understood that the principles of the invention may be applied to a flexible hose of the type for supplying water under pressure to a pressure-powered pool cleaner. In such pressure-type application, water under pressure would be utilized to axially expand the bellows assembly 64 with the pump 18 is turned on; and the spring 72 would be re-oriented to axially collapse the bellows assembly when the pump is turned off. Accordingly, no limitation on the invention is intended by way of the foregoing description and accompanying drawings, except as set forth in the appended claims.

What is claimed is:

1. A rotatable hose coupling for mounting in-line with a flexible hose coupled between a pool cleaner and a fluid pressure source, said rotatable hose coupling comprising:

a first housing member;

a second housing member defining a slide bore for axially and slidably receiving one end of said first housing member, said second housing member further defining first and second cam surfaces disposed in axially opposed and spaced-apart relation;

at least one cam element carried by said first housing member in a position axially between said first and second cam surfaces defined by said second housing member, said at least one cam element being respectively engageable with said first and second cam surfaces upon relative axial displacement between said first and second housing members for effecting incremental part-circle relative rotation therebetween; and means for effecting relative axial displacement between said first and second housing members in response to cyclic on-off operation of the fluid pressure source.

2. The rotatable hose coupling of claim 1 wherein the fluid pressure source is a vacuum source.

3. The rotatable hose coupling of claim 1 wherein said first housing member comprises a generally tubular plunger defining a fluid flow passage therethrough, and wherein said second housing member comprises a generally cylindrical cam housing defining a fluid flow passage therethrough, said plunger having one end axially and slidably received into one end of said cam housing.

4. The rotatable hose coupling of claim 3 wherein said plunger has a hose fitting at an opposite end thereof.

5. The rotatable hose coupling of claim 3 wherein cam housing defines a hose fitting at an opposite end thereof.

6. The rotatable hose coupling of claim 3 wherein said cam housing comprises a primary sleeve defining a slide bore for axially and slidably receiving said one end of said plunger, and a secondary sleeve slidably and nonrotatably interfitted with said primary sleeve and cooperating therewith to define a radially enlarged stepped bore segment, said first and second cam surfaces being disposed respectively at opposite axial ends of said stepped bore segment.

7. The rotatable hose coupling of claim 6 wherein said first cam surface is formed on said primary sleeve, and said second cam surface is formed on said secondary sleeve.

8. The rotatable hose coupling of claim 6 wherein said first and second cam surfaces each comprises a circumferential repeating array of sawtooth teeth, said teeth of said first cam surface being arranged in axially offset relation with said teeth of said second cam surface.

9. The rotatable hose coupling of claim 6 wherein said at least one cam element comprises at least one cam pin projecting radially outwardly into said stepped bore segment axially between said first and second cam surfaces.

10. The rotatable hose coupling of claim 6 wherein said at least one cam element comprises a pair of cam pins projecting radially outwardly in opposite directions into said stepped bore segment axially between said first and second cam surfaces.

11. The rotatable hose coupling of claim 1 wherein said displacement means comprises a spring-loaded bellows assembly.

12. The rotatable hose coupling of claim 11 wherein said bellows assembly comprises a collapsible bellows movable between axially expanded and collapsed positions and defining a bellows chamber, said bellows having one end mounted on one of said first and second housing members, and an opposite end rotatably supported by the other of said first and second housing members, and a spring for normally urging said bellows to one of said expanded and collapsed positions, said bellows being responsive to fluid pressure communicated with said bellows chamber for displacement to the other of said expanded and collapsed positions when the fluid pressure source is turned on, whereby cyclic on-off operation of the fluid pressure source effects axial displacement between said first and second housing members to correspondingly effect part-circle rotational displacement therebetween.

13. The rotatable hose coupling of claim 12 further including means for limiting relative rotation between said first and second housing members to unidirectional rotation.

14. The rotatable hose coupling of claim 13 wherein said rotation limiting means comprises a set of ratchet seats formed on one of said first and second housing members, and a set of ramped ratchet teeth formed on the other of said first and second housing members.

15. A rotatable hose coupling for mounting in-line with a flexible hose coupled between a pool cleaner and a fluid pressure source, said rotatable hose coupling comprising:
   a generally cylindrical plunger defining a flow passage therethrough;
   a generally cylindrical cam housing defining a fluid passage therethrough, said fluid passage of said cam housing including a slide bore for axially and slidably receiving one end of said plunger, said cam housing further defining a radially enlarged internal stepped bore segment with first and second cam surfaces disposed in axially opposed and spaced-apart relation at opposite axial ends thereof;
   at least one cam pin carried by said plunger and projecting radially outwardly therefrom into said stepped bore segment in a position axially between said first and second cam surfaces defined by said cam housing, said at least one cam pin being respectively engageable with said first and second cam surfaces upon relative back-and-forth axial displacement between said plunger and said cam housing for effecting incremental part-circle relative rotation therebetween; and
   means for effecting relative back-and-forth axial displacement between said plunger and said cam housing in response to cyclic on-off operation of the fluid pressure source.

16. The rotatable hose coupling of claim 15 wherein the fluid pressure source is a vacuum source.

17. The rotatable hose coupling of claim 15 wherein at least one of said plunger and said cam housing includes a hose fitting for in-line connection thereof to the flexible hose.

18. The rotatable hose coupling of claim 15 wherein said cam housing comprises a primary sleeve defining said slide bore for axially and slidably receiving said one end of said plunger, and a secondary sleeve slidably and nonrotatably interfitted with said primary sleeve and cooperating therewith to define said stepped bore segment, said first cam surface being formed on said primary sleeve and said second cam surface being formed on said secondary sleeve.

19. The rotatable hose coupling of claim 18 wherein said first and second cam surfaces each comprises a circumferential repeating array of saw-tooth teeth, said teeth of said first cam surface being arranged in axially offset relation with said teeth of said second cam surface.

20. The rotatable hose coupling of claim 18 wherein said at least one cam element comprises a pair of cam pins projecting radially outwardly in opposite directions into said stepped bore segment.

21. The rotatable hose coupling of claim 15 wherein said displacement means comprises a spring-loaded bellows assembly including a collapsible bellows movable between axially expanded and collapsed positions and defining a bellows chamber, said bellows having one end mounted on one of said plunger and said cam housing, an opposite end rotatably supported by the other of said plunger and said cam housing, and a spring for normally urging said bellows to one of said expanded and collapsed positions, said bellows being responsive to fluid pressure communicated with said bellows chamber for displacement to the other of said expanded and collapsed positions when the fluid pressure source is turned on, whereby cyclic on-off operation of the fluid pressure source effects axial displacement between said plunger and said cam housing to correspondingly effect part-circle rotational displacement therebetween.

22. The rotatable hose coupling of claim 21 wherein said bellows chamber is in pressure communication with said flow passage formed through said plunger.

23. The rotatable hose coupling of claim 22 further including means for limiting relative rotation between said plunger and said cam housing to unidirectional rotation.

24. In a pool cleaner system for a swimming pool said pool cleaner system including a pool cleaner for traversing submerged pool surfaces to collect debris, a filtration system including a pump for circulating water from the pool through a filter unit, and a flexible hose for coupling the pool cleaner with the pump, a rotatable hose coupling comprising:
   a first housing member defining a flow passage therethrough;
   a second housing member defining a flow passage therethrough including a slide bore for axially and slidably receiving one end of said first housing member;
   cam means carried by said first and second housing members for effecting relative rotation therebetween through a part-circle increment in response to axial back-and-forth displacement of said first housing member relative to said second housing member; arid
   means responsive to cyclic on-off operation of the pump for axially displacing said first housing member in one direction relative to said second housing member when the pump is turned on, and for axially displacing said first housing member in an opposite direction relative to said second housing member when the pump is turned off.

25. The rotatable hose coupling of claim 24 further including means for coupling the rotatable coupling in-line with the flexible hose.

* * * * *